US012661593B2

(12) United States Patent
Nomura et al.

(10) Patent No.: US 12,661,593 B2
(45) Date of Patent: Jun. 23, 2026

(54) INFORMATION PROCESSING DEVICE, AND METHOD AND PROGRAM FOR CONTROLLING THE SAME

(71) Applicant: ASICS Corporation, Kobe (JP)

(72) Inventors: Yasuhiro Nomura, Kobe (JP); Yuki Ko, Kobe (JP); Nao Hirakawa, Kobe (JP)

(73) Assignee: ASICS Corporation, Kobe (JP)

( * ) Notice: Subject to any disclaimer, the term of this patent is extended or adjusted under 35 U.S.C. 154(b) by 338 days.

(21) Appl. No.: 18/537,466

(22) Filed: Dec. 12, 2023

(65) Prior Publication Data

US 2024/0207743 A1 Jun. 27, 2024

(30) Foreign Application Priority Data

Dec. 23, 2022 (JP) ................................. 2022-206881

(51) Int. Cl.
| | |
|---|---|
| *A63F 13/816* | (2014.01) |
| *A63F 13/212* | (2014.01) |
| *A63F 13/245* | (2014.01) |
| *A63F 13/35* | (2014.01) |
| *A63F 13/46* | (2014.01) |
| *A63F 13/798* | (2014.01) |

(52) U.S. Cl.
CPC .......... *A63F 13/816* (2014.09); *A63F 13/212* (2014.09); *A63F 13/46* (2014.09)

(58) Field of Classification Search
CPC ...... A63F 13/816; A63F 13/212; A63F 13/46; A63F 13/245; A63F 13/35; A63F 13/798
See application file for complete search history.

(56) References Cited

U.S. PATENT DOCUMENTS

| | | | | |
|---|---|---|---|---|
| 2002/0016235 A1* | 2/2002 | Ashby | .................. | A63B 21/005 |
| | | | | 482/8 |
| 2021/0308522 A1* | 10/2021 | Booher | .................. | G16H 20/30 |
| 2022/0054891 A1* | 2/2022 | Owusu | ............... | A63B 24/0062 |

OTHER PUBLICATIONS

ASICS Corporation, "ASICS Virtual Race" [online], retrieved Nov. 28, 2022, Internet https://www.asics.com/jp/ja-jp/mk/virtual_race>.

* cited by examiner

*Primary Examiner* — Thomas H Henry
(74) *Attorney, Agent, or Firm* — Studebaker Brackett PLLC

(57) ABSTRACT

An information processing device in a virtual race provision system that provides a virtual race on a virtual course using an indoor aerobic exercise device, the information processing device comprising: a generator that generates drive information to drive an indoor aerobic exercise device run by a user that participates in a virtual race on the basis of course geometry set for a virtual course, the geometry including at least a running distance and slope; a time correction unit that corrects completion time of the virtual race by the user on the basis of running information acquired by a sensor device worn by the user when the user runs on the indoor aerobic exercise device; and a determination unit that determines a ranking of the user that participates in the virtual race on the basis of the corrected completion time corrected by the time correction unit.

9 Claims, 11 Drawing Sheets

USER INFORMATION TABLE

TB10

| USER ID | USER NAME | EXERCISE DEVICE IDENTIFICATION INFORMATION | LEVEL | BASIC INFORMATION | | | |
| --- | --- | --- | --- | --- | --- | --- | --- |
| | | | | GENDER | AGE | HEIGHT/WEIGHT | BIOMETRIC INFORMATION | ... |
| user_001 | USER A | ZR–T*U20 | INTERMEDIATE | W | 24 | ****.* [cm] / **.* [kg] | BLOOD PRESSURE: / HEART RATE: ** |
| user_002 | USER B | X–401 | BEGINNER | M | 38 | **.* [cm] / **.* [kg] | BLOOD PRESSURE: / HEART RATE: ** |
| user_003 | USER C | AD–T23*W | ADVANCED | W | 43 | ****.* [cm] / **.* [kg] | BLOOD PRESSURE: / HEART RATE: ** |
| ... | | | | ... | ... | ... | ... |

EXERCISE DEVICE INFORMATION TABLE

TB20

| MANUFACTURER ID | EXERCISE DEVICE IDENTIFICATION INFORMATION | SUPPORTED FUNCTION | | |
| --- | --- | --- | --- | --- |
| | | VARIABLE TILT | VARIABLE SPEED | ··· |
| mf_001 | ZR~T*U10 | × | ○ | |
| | ZR~T*U20 | ○ | ○ | |
| mf_002 | X**~401 | ○ | × | |
| | ··· | ··· | ··· | |
| mf_012 | AD~T23*W | ○ | ○ | |
| ··· | ··· | ··· | ··· | |

COURSE GEOMETRY INFORMATION TABLE                    TB30

COURSE ID: course_003  DIFFICULTY 10

COURSE ID: course_002  DIFFICULTY 2

COURSE ID: course_001  DIFFICULTY 3

| NODE NO. | X COORDINATE | Y COORDINATE | Z COORDINATE | SPEED |
|---|---|---|---|---|
| N1 | x1 | y1 | z1 | v1 |
| N2 | x2 | y2 | z2 | v1 |
| N3 | x3 | y3 | z2 | v2 |
| N4 | x4 | y4 | z3 | |
| : | : | : | : | : |

REFERENCE VALUE TABLE FOR INDEX

TB40

| EVALUATION INDEX | PACE | | | | |
|---|---|---|---|---|---|
| | 3:00 | 4:00 | 5:00 | 6:00 | · · · |
| PITCH [steps/min] | 189 | 181 | 174 | 167 | |
| VERTICAL MOTION [%] TO HEIGHT RATIO | 5.7 | 5.4 | 5.3 | 5.2 | |
| LANDING [m/s2] IMPACT | 35.7 | 29.6 | 24.7 | 21.1 | |
| KICKING ACCELERATION [m/s2] | 59.7 | 52 | 46.7 | 43.8 | |
| PELVIC DROP AMOUNT [%] | 3.3 | 3.4 | 3.4 | 3.5 | |
| PELVIC REARWARD TILT AMOUNT | 1.4 | 1.4 | 1.4 | 1.4 | |
| KICKING TIME [ms] | 120 | 122 | 126 | 131 | |
| AMOUNT OF BRAKING[m/s] | 0.61 | 0.53 | 0.48 | 0.46 | |
| HORIZONTAL IMPACT FORCE [m/s2] | 53.2 | 44.8 | 38.8 | 35.1 | |
| TIME POINT OF PELVIC ROTATION AFTER LANDING | 16 | 16 | 16 | 16 | |
| AMOUNT OF PELVIC ROTATION | 24.3 | 22.4 | 20.5 | 18.6 | |
| PELVIC LIFT AMOUNT [°] | 5.8 | 5.7 | 5.5 | 5.3 | |
| STRIDE TO HEIGHT RATIO | 0.87 | 0.77 | 0.69 | 0.63 | |
| ⋮ | ⋮ | ⋮ | ⋮ | | |

| RANK | USER NAME | CORRECTED COMPLETION TIME |
|------|-----------|---------------------------|
| 1 | USER A | 1:03:00 |
| 2 | USER D | 1:10:30 |
| 3 | USER C | 1:14:30 |
| 4 | USER G | 1:15:14 |
| . . . | | |
| 20 | USER B | 1:18:05 |
| . . . | | |

TB41

| RANK | USER NAME | COMPLETION TIME | SCORE |
|------|-----------|-----------------|-------|
| 1 | USER A | 1:09:00 | 82 |
| 2 | USER B | 1:11:50 | 54 |
| 3 | USER C | 1:14:40 | 72 |
| 4 | USER D | 1:15:30 | 89 |
| . . . | | | |
| 20 | USER X | 1:17:40 | 82 |
| . . . | | | |

FIG. 8

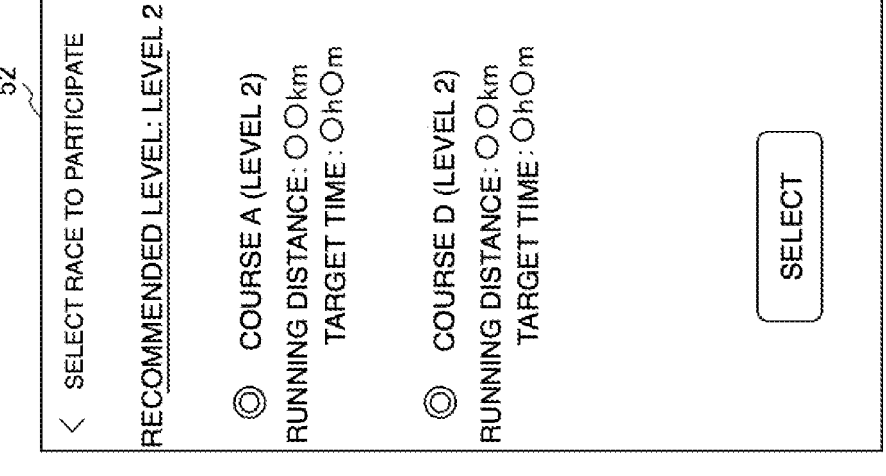

52

SELECT RACE TO PARTICIPATE

RECOMMENDED LEVEL: LEVEL 2

◎ COURSE A (LEVEL 2)
RUNNING DISTANCE: ○○km
TARGET TIME: ○h○m

◎ COURSE D (LEVEL 2)
RUNNING DISTANCE: ○○km
TARGET TIME: ○h○m

SELECT

SELECT RACE TO PARTICIPATE

◎ COURSE A (LEVEL 2)
RUNNING DISTANCE: ○○km
TARGET TIME: ○h○m

◎ COURSE B (LEVEL 1)
RUNNING DISTANCE: ○○km
TARGET TIME: ○h○m

◎ COURSE C (LEVEL 3)
RUNNING DISTANCE: ○○km
TARGET TIME: ○h○m

SELECT

| COURSE ID : re_course_001 | | | | |
|---|---|---|---|---|
| NODE NO. | X COORDINATE | Y COORDINATE | z COORDINATE | SPEED |
| N1′ | x11 | y11 | z11 | v11 |
| N2′ | x12 | y12 | z11 | v12 |
| N3′ | x13 | x13 | z11 | v12 |
| N4′ | x14 | y14 | z11 | |
| ⋮ | ⋮ | ⋮ | ⋮ | ⋮ |

INFORMATION PROCESSING DEVICE, AND METHOD AND PROGRAM FOR CONTROLLING THE SAME

REFERENCE TO RELATED APPLICATIONS

The disclosure of Japanese Patent Application No. 2022-206881 filed on Dec. 23, 2022 including the specification, drawings and abstract is incorporated herein by reference in its entirety.

BACKGROUND

Technical Field

The present invention relates to an information processing device, and method and program for controlling the same.

Background Information

A "virtual race" in which a race such as marathon and road bike race is held online has become increasingly popular recently (e.g., ASICS Corporation, "ASICS VIRTUAL RACE," [online], retrieved Nov. 28, 2022, Internet, <URL: https://www.asics.com/jp/ja-jp/mk/virtual_race>, hereinafter referred to as non-patent document 1). In the virtual race, runners each carry a communication device that is capable of acquiring location information, and they may run the course for the distance specified in the race at any time point during the event period. That is, in the virtual race, the runners can run any course they wish at any time point of their own choice. The accumulated distance traveled may be uploaded to the server of the organizer via an application owned by the runner, for example, and times, and rankings may be recorded. The virtual race may also be referred to as virtual racing, online marathon, virtual marathon, and online cycling, for example.

SUMMARY

The virtual race disclosed in non-patent document 1 is intended to use outdoor public roads and mountain roads, for example, as courses. Here, if the virtual races can be embodied using indoor aerobic exercise device such as running machines, runners can participate in races independent from the weather conditions. This is highly convenient for them. However, in contrast to running outdoors, running indoors does not offer scenic changes or course undulations, causing runners to easily feel monotonous.

That is, in providing virtual races using the indoor aerobic exercise device, a plan to motivate runners to participate have been needed.

An information processing device in a virtual race provision system that provides a virtual race on a virtual course using an indoor aerobic exercise device according to an embodiment of the present invention includes: a generator that generates drive information to drive an indoor aerobic exercise device run by a user that participates in a virtual race on the basis of course geometry set for a virtual course, the geometry including at least a running distance and slope: a time correction unit that corrects completion time of the virtual race by the user on the basis of running information acquired by a sensor device worn by the user when the user runs on the indoor aerobic exercise device; and a determination unit that determines a ranking of the user that participates in the virtual race on the basis of the corrected completion time corrected by the time correction unit.

In the information processing device according to an embodiment of the present invention, the time correction unit may correct the completion time of the user on the basis of a running score of the user, which is computed from an evaluation value of an index related to a running form of the user on the basis of the running information of the user, and the running score of the user may be computed on the basis of a difference between an evaluation value of the index, which is set on the basis of correlation between running speed and the index collected from an unspecified number of users, and an evaluation value of the user.

The information processing device according to an embodiment of the present invention, may further include an acquisition unit that acquires biometric information of the user. The time correction unit may correct the completion time of the user on the basis of a difference between a biometric reference value, which is set on the basis of correlation between running speed and biometric information during running collected from an unspecified number of users, and a value of the biometric information of the user during running.

In the information processing device according to an embodiment of the present invention, a plurality of types of virtual courses may be set in accordance with level indicating running ability of the user that participates in the virtual race, and the generator may generate drive information to drive the indoor aerobic exercise device of the user on the basis of course geometry of the virtual course selected by the user among the types of virtual courses.

In the information processing device according to an embodiment of the present invention, the generator may further generate display information to display a screen on a communication terminal of the user, which screen presents a virtual course in accordance with the level of the user that participates in the virtual race.

In the information processing device according to an embodiment of the present invention, the time correction unit may correct the completion time of the user in accordance with difficulty of the virtual course that the user has run.

In the information processing device according to an embodiment of the present invention, the time correction unit may correct the completion time of the user in accordance with a type of the indoor aerobic exercise device on which the user that participates in the virtual race runs.

In the information processing device according to an embodiment of the present invention, the generator may generate drive information to drive course geometry in accordance with a type of the indoor aerobic exercise device on which the user that participates in the virtual race runs, and course geometry when the user runs on the indoor aerobic exercise device in which the user is disabled to set the slope may be set to be longer than course geometry when the user runs on the indoor aerobic exercise device in which the user is enabled to set the slope.

The information processing device according to an embodiment of the present invention may further include a course correction unit that corrects course geometry of the virtual course in accordance with a type of the indoor aerobic exercise device on which the user participating in the virtual race runs, and the course correction unit may change the course geometry to extend the running distance of the virtual course that the user runs when the user runs on the indoor aerobic exercise device in which the user is disabled to set the slope.

A method for controlling an information processing device in a virtual race system that provides a virtual race on a virtual course using an indoor aerobic exercise device according to an embodiment of the present invention causes the information processing device to perform the steps of: generating drive information to drive an indoor aerobic exercise device run by a user that participates in a virtual race on the basis of course geometry set for a virtual course, the geometry including at least a running distance and slope; correcting completion time of the virtual race by the user on the basis of running information acquired by a sensor device worn by the user when the user runs on the indoor aerobic exercise device; and determining a ranking of the user that participates in the virtual race on the basis of the corrected completion time corrected in the correcting step.

A control program for an information processing device in a virtual race system that provides a virtual race on a virtual course using an indoor aerobic exercise device according to an embodiment of the present invention causes the information processing device to execute the functions of: generating drive information to drive an indoor aerobic exercise device run by a user that participates in a virtual race on the basis of course geometry set for a virtual course, the geometry including at least a running distance and slope; correcting completion time of the virtual race by the user on the basis of running information acquired by a sensor device worn by the user when the user runs on the indoor aerobic exercise device; and determining a ranking of the user that participates in the virtual race on the basis of the corrected completion time corrected by the correcting function.

According to one embodiment of the present invention, in providing a virtual race using an indoor aerobic exercise device, an information processing device, for example, in a virtual race provision system, which device increases motivation of runners to participate since ranking is not based solely on completion time may be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an example of an exercise device information table according to an embodiment of the present invention, FIG. 7 is a table illustrating an example of reference values for indices according to an embodiment of the present invention, FIG. 8 is a schematic diagram illustrating a change in rankings due to correction of completion times, FIGS. 9A and 9B are diagrams each illustrating an example of a display screen of a user terminal according to an embodiment of the present invention.

DETAILED DESCRIPTION

Figure 1:
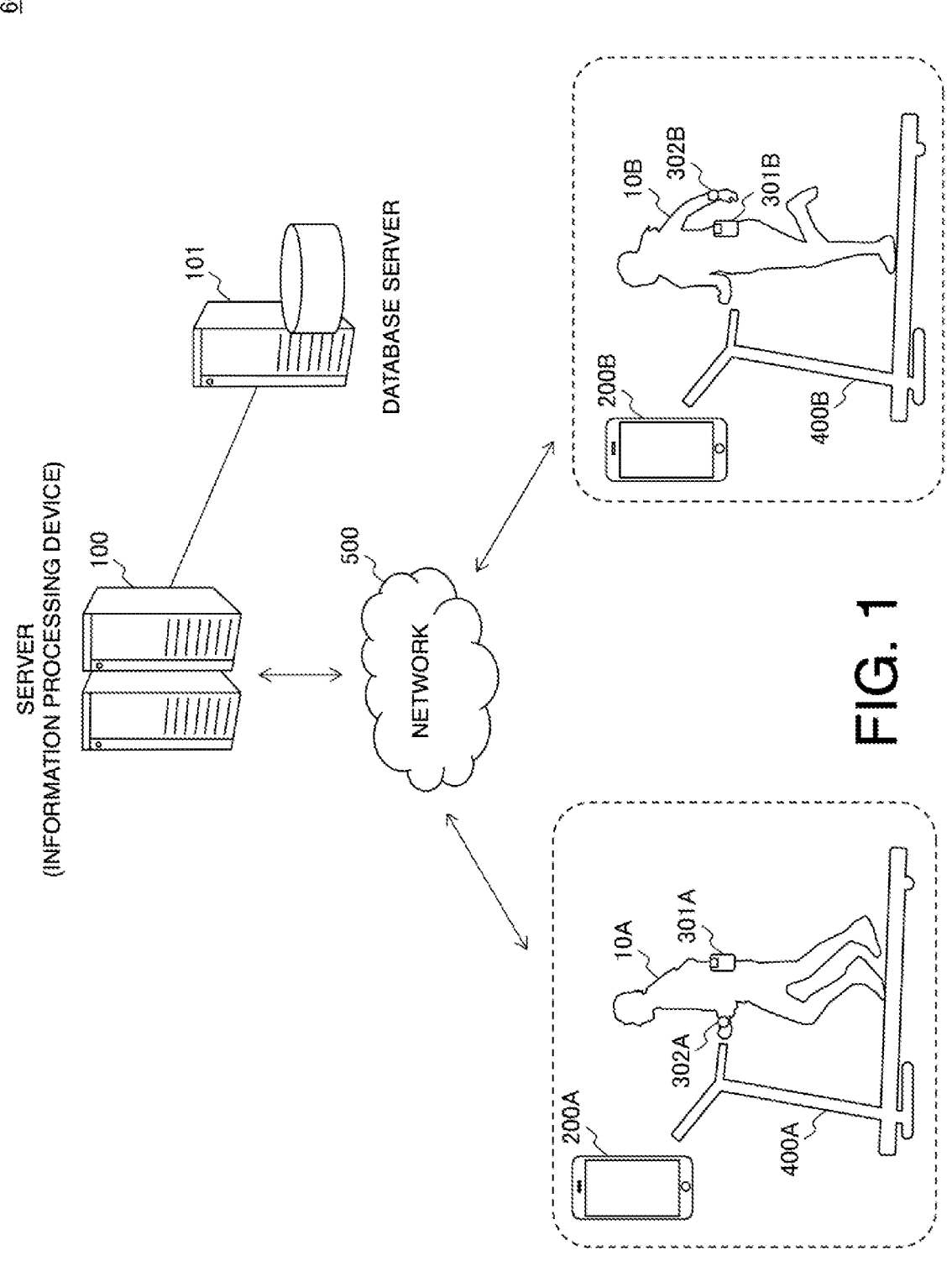
FIG. 1 is a schematic diagram illustrating a configuration of a virtual race provision system according to an embodiment of the present invention.

With reference to the drawings, an embodiment of this invention (also referred to as the present invention) for the present disclosure will be described. The drawings show an example, and the present invention is not limited to what is shown in the drawings. For example, the number of servers (information processing devices), user terminals (communication devices), database servers, indoor aerobic exercise devices, and sensor devices and their size ratios, data sets (tables), and flowcharts shown in the drawings are examples, and the present invention is not limited thereto.

System Configuration

FIG. 1 is a diagram illustrating a configuration example of a virtual race provision system according to an embodiment of the present invention. The virtual race provision system 600 may correspond to an information and communication system that provides users (runners) with virtual races in which they can participate using an indoor aerobic exercise device. In the virtual race provision system, each user entered in a virtual race may run a specified distance using the indoor aerobic exercise device, and the user may be ranked (ranking) on the basis of her/his time. In doing so, according to one embodiment of the present invention, the ranking may be corrected in accordance with the running form of the user, and the type of the indoor aerobic exercise device, for example (details will be described below).

The virtual race provision system 600 may include at least a server 100, database server 101, user communication terminals (user terminals) 200 (200A, 200B), and sensor devices 301 (301A, 301B), 302 (302A, 302B). The virtual race provision system 600 may further include indoor aerobic exercise devices 400 (400A, 400B). In FIG. 1, two users participating in the virtual race are designated as users 10A and 10B, and the user terminals, sensor devices, and indoor aerobic exercise devices associated with the users 10A and 10B are distinguished by the letters "A" and "B," respectively. However, more or less users participating in the virtual race may be present, and as many user terminals, sensor devices, and indoor aerobic exercise devices as corresponding to the users may be present. Hereinafter, unless otherwise distinguished, the user, user terminal, sensor devices, and indoor aerobic exercise device will be referred to simply as the user 10, user terminal 200, sensor devices 301, 302, and indoor aerobic exercise device 400, respectively. The sensor device 301 may correspond to a motion sensor and the sensor device 302 may correspond to a vital sensor as will be described in detail below.

The server 100 may be capable of executing various processes related to virtual races embodied by the virtual race provision system 600. The server 100 may be connected via the network 500 to the user terminal 200. The network 500 may include wireless and wired networks such as wireless LANs (WLANs), wide area networks (WANs), integrated service digital networks (ISDNs), wireless LANs, code division multiple access (CDMA), long term evolution (LTE), LTE-Advanced, 4th generation communications (4G), 5th generation communications (5G), and 6th generation communications (6G) and later mobile communication systems, or a combination of these systems.

The server 100 may further transmit and receive various types of data to and from the database server 101. As will be described in detail below, the database server 101 may store (record) various data needed to embody the functions of the virtual race provision system 600 according to an embodiment of the present invention.

In FIG. 1, the server 100 and database server 101 are shown one each, but are not limited to this. That is, the functions described as provided by the server 100 may be embodied by multiple servers, and a plurality of database servers 101 may be provided. The server 100 may be, for example, a distributed server system that operates cooperatively by communicating over a network, or a cloud server. That is, the server 100 is not limited to physical servers, but may also include software virtual servers.

The user terminal 200 corresponds to a communication terminal of a user 10, in which an application for using virtual races (hereinafter, also referred to as "racing application") may be installed. As will be described in detail below, the user terminal 200 may be able to transmit information acquired from the motion sensor 301, vital sensor 302, and indoor aerobic exercise device 400 to the server 100 via the race application.

Although FIG. 1 shows a smartphone as a user terminal 200, any terminal capable of embodying the functions described in the following embodiments may be used as a user terminal 200. For example, the user terminal 200 may correspond to a computer (e.g., tablet, desktop personal computer, laptop computer), and handheld computing device (by way of example, not limited to, a wearable device (e.g., glasses-type device (smart glasses), and watch-type device (smart watch)).

The indoor aerobic exercise device 400 is not limited to any device if it is installed indoors and achieves aerobic exercise by the user. For example, if the aerobic exercise is directed to walking or running, the indoor aerobic exercise device 400 may correspond to a treadmill, walking machine, running machine, or jogging machine, for example. If the aerobic exercise is directed to cycling, the indoor aerobic exercise device 400 may correspond to a smart trainer (roller platform), or smart bike, for example. Here, description will be given assuming that the virtual race is conducted in a competition (running) in which the user runs on her/his own legs, and the indoor aerobic exercise device 400 is directed to a treadmill. Accordingly, the indoor aerobic exercise device 400 may hereinafter be referred to as "treadmill 400."

According to an embodiment of the present invention, the treadmill 400 may be directed to a device that allows a user to run in place by rotating a wide, wheeled belt with a motor and causing the user to run in the opposite direction of the rotation of the belt. The treadmill 400 may also compute the distance run by the user from the belt rotation speed and running time. The treadmill 400 may have at least an adjustable belt rotation speed, and some models may have a variable belt tilt angle. In one embodiment of the present invention, the rotation speed and tilt angle of the treadmill 400 may be controlled on the basis of the predetermined drive information. For example, the treadmill 400 is capable of acquiring the drive information via wireless or wired communications, and the drive information may include information (programs) that specifies the duration of the rotation speed of the belt and the tilt angle. The drive information may be transmitted from the server 100 to the communication terminal 200 and from the communication terminal 200 to the treadmill 400. Here, the treadmill 400 and the communication terminal 200 may have communication functions that allow data to be transmitted and received via near field communication (Bluetooth (registered trademark)) or cable connection.

The user 10 may run on the treadmill 400 with the motion sensor 301 and the vital sensor 302 worn. The motion sensor 301 and the vital sensor 302 correspond to wearable devices with communication functions that may be worn on the body of the user 10 to acquire running and biometric information of the user 10 and transmit the acquired information to the user terminal 200. In one embodiment of the present invention, the motion sensor 301 may be worn in the vicinity of the waist along the trunk of the user 10 and measure 10 sensor data as running information to compute an evaluation value for an index to evaluate the running form of the user 10. The vital sensor 302 may also acquire biometric information of the running user 10. Although the motion sensor 301 and the vital sensor 302 are separately illustrated in FIG. 1, the present invention is not limited to this, and the motion sensor 301 and the vital sensor 302 may be integrated into a single sensor device to acquire running and biometric information, or even a plurality of sensor devices may be used. Alternatively, the running and biometric information of the user 10 may be acquired by a sensor device installed on the treadmill 400. The running information and biometric information will be described below.

Various data used in the virtual race provision system 600 according to one embodiment of the present invention and stored in the database server 101, for example, will be described below.

Figure 3:
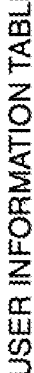
FIG. 3 is an example of a user information table according to an embodiment of the present invention.

FIG. 3 shows an example of a user information table for users participating in a virtual race. A table may be directed to a set of various types of information (data set). In the example in FIG. 3, the user information table TB10 may associate and store the user name, exercise device identification information, level, and basic information with the user ID (IDentifier), as an identifier to uniquely identify the user 10. The "exercise device identification information" may correspond to information that uniquely identifies the indoor aerobic exercise device 400 used by the user, and may be, for example, a product number or serial number assigned by the manufacturer of the indoor aerobic exercise device 400. The "level" may correspond to a proficiency level for running, which indicates the running ability of the user and may be assigned on the basis of the running history, virtual race history, and physical ability (e.g., muscle strength, and endurance run times) of the user, for example. The "basic information" may correspond to information that indicates the nature and characteristics of the user, and may include, for example, the gender, age, height, weight, and biometric information (e.g., maximum/minimum blood pressure, and heart rate), for example. In addition to the information shown in FIG. 3, the user information may include information indicating the proficiency of the user for running, such as running history, which indicates the period from when the user has started running to the present, and the history of virtual races the user has participated in the past.

FIG. 4 shows an example of an exercise device information table. The exercise device information table TB20 may store information on the functions and features of the indoor aerobic exercise device 400 used by the user, such as the functions that each indoor aerobic exercise device identified by the "exercise device identification information" in the user information table TB10 described above has. For example, it is recognized that the indoor aerobic exercise device 400 identified by the exercise device identification information "ZR-T*U10" is manufactured by the manufacturer identified by the manufacturer ID "mf_001" and the supported function is variable speed only. The information stored in the exercise device information table TB20 is not limited to the information shown in FIG. 4, and other information may be stored. Other data stored in the database server 101 will be described below.

Next, with reference to FIG. 2, the hardware and functional configurations of the server 100, user terminal 200, motion sensor 301, and vital sensor 302 according to an embodiment of the present invention will be described.

Sensor Device

Figure 2:
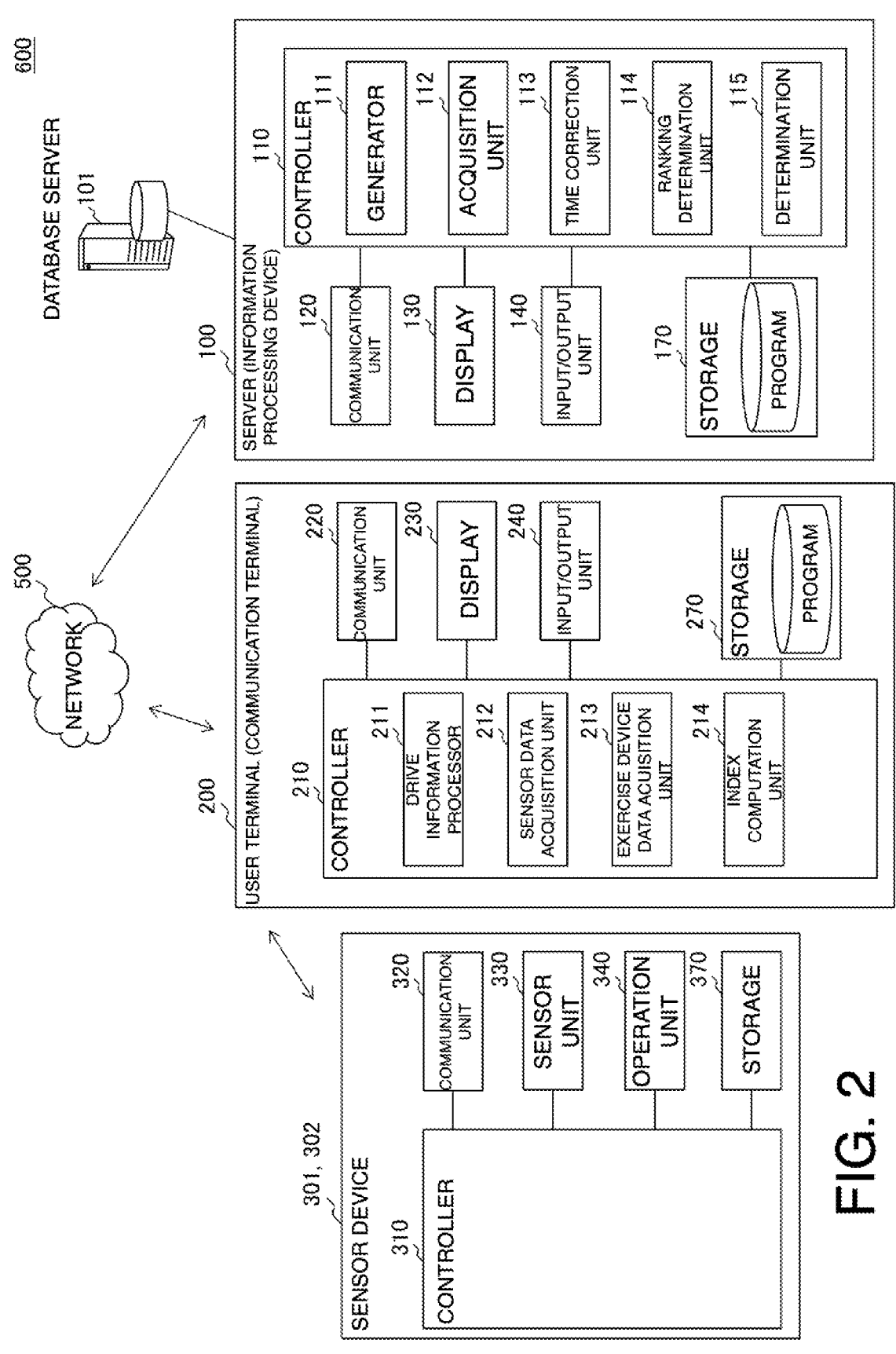
FIG. 2 is an example of a functional block diagram illustrating a server (information processing device), user terminal (communication terminal), and sensor device according to an embodiment of the present invention.

FIG. 2 shows an example of a block diagram of a sensor device (motion sensor 301, and vital sensor 302) according to an embodiment of the present invention. Since the basic configuration and functions of the motion sensor 301 and vital sensor 302 are the same except for the information to be acquired, the same block diagram will be referenced to describe them.

The motion sensor 301 and vital sensor 302 each may include a controller 310, communication unit 320, sensor unit 330, operation unit 340, and storage 370. The controller 310 may be configured by an arithmetic processor such as a CPU and acquire the output of the sensor unit 330 at predetermined time points by executing a program stored in the storage 370. The controller 310 may also transmit the data acquired from the sensor unit 330 to the user terminal 200 via the communication unit 220.

In the motion sensor 301, the sensor unit 330 may detect, for example, acceleration occurring in a linear direction along three mutually orthogonal axes, angular velocity occurring in a rotational direction about three mutually orthogonal axes, or geomagnetism. The sensor unit 330 may acquire sensor data such as acceleration and angular velocity as the user 10 runs on the treadmill 400 as running information. The running information may be stored in the storage 370 along with the information on the time acquired.

In the vital sensor 302, the sensor unit 330 may detect biometric information such as body temperature, blood pressure, heart rate, and number of breaths per unit time of the user 10. The biometric information may be stored in the storage 370 along with the information on the time acquired.

The communication unit 320 has a function to transmit and receive data to and from the user terminal 200 using a predetermined communication protocol through wireless communication such as near field communication (e.g., Bluetooth (registered trademark) Low Energy: BLE) and wireless local area network (LAN) and wired communication. For example, the communication unit 320 may transmit the running information and biometric information stored in the storage 370 to the user terminal 200. The communication unit 320 may transmit to the user terminal 200 the running information and biometric information stored in the storage 370 collectively after the measurement by the motion sensor 301 and the vital sensor 302 is completed, and also transmit the running information and biometric information stored in the storage 370 at a predetermined time point during the measurement by the sensor 330.

The operation unit 340 may be configured by, for example, input buttons or a touch panel, and may accept operations by the user 10. For example, in the motion sensor 301 and vital sensor 302, measurement by the sensor unit 330 may be started, suspended, or stopped, for example, when an operation to start measurement is entered by the user 10 in the operation unit 340.

User Terminal (1) Hardware Configuration of User Terminal

A user terminal 200 may include a controller 210, communication unit 220, display 230, input/output unit 240, and storage 270.

The controller 210 may typically be directed to a processor including a central processing unit (CPU), micro processing unit (MPU), and graphics processing unit (GPU), for example, and may be embodied by logic circuits (hardware) or dedicated circuits formed in the integrated circuits (IC) chips, and the large scale integration (LSI), for example. The controller 210 may perform the functions and methods shown in the embodiments by reading the programs stored in the storage 270 and executing the codes or instructions contained in the read programs.

The controller 210 may control the communication unit 220, display 230, and input/output unit 240. Specifically, the controller 210 may control communication of the user terminal 200 with the server 100, motion sensor 301, vital sensor 302, and treadmill 400 by the communication unit 220, and transmit and receive various data between them. The controller 210 may control the display of the data on the display 230. For example, the controller 210 may display on the display 230 the ranking of the user 10 in the virtual race and the indices described below for the running form of the user 10, for example. In addition, the controller 210 may control the transmission of various types of information to and from external devices via the input/output unit 240. For example, the controller 210 may transmit various types of information to the functional units in response to the user input operations accepted by the input device, or transmit information from the functional units to output devices (not shown) such as a touch panel, monitor, and speaker.

The storage 270 stores various programs and various data needed for the user terminal 200 to operate. For example, the storage 270 may store the racing application program described above. The storage 270 may include, for example, a flash memory. The storage 270 may also include, for example, a memory (e.g., a random access memory (RAM), and a read only memory (ROM)) that provides a working area for the controller 210.

The communication unit 220 may be implemented as hardware such as a network adapter, communication software, and combinations thereof, and may transmit and receive various types of data to and from the server 100 via the network 500. The communication may be performed by either wired or wireless means, and any communication protocol may be used if they are capable of communicating with each other. The communication unit 220 may transmit various data to the server 100 according to instructions from the controller 210. The communication unit 220 may also receive various data transmitted from the server 100 and communicate them to the controller 210. The communication unit 220 may also perform the wireless or wired communication described above with the motion sensor 301 and the vital sensor 302. In addition, the communication unit 220 may perform wireless or wired communication with the treadmill 400.

The display 230 may correspond to a monitor that displays data in accordance with the display data written in the frame buffer, such as, for example, a touch panel or touch display.

The input/output unit 240 may include an input device for various operations on the user terminal 200 and an output device for outputting the results of the process processed by the user terminal 200. The input device may include, for example, a touch panel, touch display, camera, and microphone. The output device may output the results of the process processed by the controller 210. The output device may include, for example, a display, touch panel, and speaker.

(2) Functional Configuration of User Terminal

The user terminal 200 may include a drive information processor 211, a sensor data acquisition unit 212, an exercise device data acquisition unit 213, and an index computation unit 214 as functions embodied by the controller 210.

The drive information processor 211 may acquire drive information from the server 100 to drive the treadmill 400 along the virtual course and output it to the treadmill 400. The drive information will be described below.

The sensor data acquisition unit 212 may acquire sensor data measured by the motion sensor 301 worn by the user 10 running on the treadmill 400 as running information. The sensor data acquisition unit 212 may also acquire sensor data measured by the vital sensor 302 worn by the user 10 as biometric information.

The exercise device data acquisition unit 213 may acquire distance data indicating the traveled distance from the treadmill 400 on which the user 10 runs. The exercise device data acquisition unit 213 may further acquire from the treadmill 400 elapsed time data indicating the elapsed time since the start of running, and load history data indicating the change history of the load (e.g., running speed, and tilt angle) of the treadmill 400, for example. The exercise device data acquisition unit 213 may also acquire from the treadmill 400 the time taken by the user 10 to complete the virtual race using the treadmill 400.

The index computation unit 214 may compute an evaluation value of an index regarding the running form of the user on the basis of at least the running information acquired from the motion sensor 301. Here, the index computation unit 214 may use data acquired from the treadmill 400 (e.g., distance data, elapsed time data, and load history data) in addition to the running information to compute the evaluation value of the index.

Here, the indices will be described below. The indices may be directed to elements that indicate the quality of the running of the user 10, which may include, for example, running speed, pitch, stride, stride to height ratio, vertical motion, vertical motion to height ratio, lateral motion, forward and rearward motion, ground contact time, idle leg time, ground contact time rate, idle leg time rate, amount of braking, amount of body drop, amount of body drop to height ratio, body drop time, braking time, propulsion time, landing impact, kicking acceleration, kicking phase duration, amount of pelvic rotation, stiffness, stiffness to weight ratio, landing angle, kicking angle, horizontal impact force, pelvic rearward tilt amount, pelvic drop amount, pelvic lift amount, time point of pelvic rotation after landing, forward tilt angle, and peak impact slope. The indices can characterize and score the running form of the user, and for example, the higher the value of the "stride to height ratio" is, the higher the score for "strength of movement" may be. Items that characterize the running form of the user may include, but are not limited to, the "strength of movement," as well as "landing with less load," "stable posture," "whole body coordination with the pelvis as the axis," "smooth center of gravity shift," and "symmetry."

As will be described in detail below, a reference value (guideline value) may be set for each index. The running form of the user may then be scored in accordance with the relative position of the index value of the user relative to the reference value. For example, for the "vertical motion to height ratio," the less the value relative to the reference value is, the higher the "landing with less load" score may be. For the "amount of pelvic rotation," the greater the value relative to the reference value is, the higher the score for "strength of movement" may be.

Any known method may be used to compute indices by the index computation unit 214. The known method may include those described in Japanese Registered Patent Nos. 6648439, 6711433, 7155345, or 5849092, for example.

Each index will be briefly described below. The index computation unit 214 may compute the running cycle, which is the period of the waveform of the vertical component of the acceleration vector indicated by the sensor data output by the motion sensor 301, and from the running cycle, compute the pitch, which is the number of steps per unit time. The index computation unit 214 may also compute stride, which is the stride length per step, by dividing the speed per minute by the pitch. In addition, the index computation unit 214 may compute the stride to height ratio by dividing the stride by the height of the user 10.

The vertical motion corresponds to the difference between the highest and lowest points of the position from the landing of one foot to the landing of the other foot. The index computation unit 214 may integrate the vertical component of the acceleration vector indicated by the sensor data output by the motion sensor 301 and compute the highest and lowest positions, and then compute the vertical motion, which is the difference between the highest and lowest positions. The index computation unit 214 may compute the vertical motion to height ratio by dividing the vertical motion by the height of the user 10. Hereinafter, the "position" may refer to the attachment position of the motion sensor 301 on the user 10, e.g., at the waist where the motion sensor 301 is attached.

The lateral motion corresponds to the range of the lateral variation of the position from the landing of one foot to the landing of the other foot. The index computation unit 214 may integrate the lateral component of the acceleration vector indicated by the sensor data output by the motion sensor 301 and compute the positions of the leftmost and rightmost points, and then compute the lateral motion, which is the difference between the leftmost and rightmost positions.

The forward and rearward motion corresponds to the range of the forward and rearward variation of the position from the landing of one foot to the landing of the other foot. The index computation unit 214 may compute the forward and rearward motion by integrating the forward and backward component of the acceleration vector indicated by the sensor data output by the motion sensor 301 and subtracting the distance traveled at the average speed.

The ground contact time corresponds to the time from the time when one foot lands to the time when the foot leaves the ground, and the idle leg time corresponds to the time from the time when one foot leaves the ground to the time when the foot lands on the ground. The index computation unit 214 may compute the ground contact time and idle leg time by identifying the time points of landing and leaving the ground on the basis of the vertical component of the acceleration vector indicated by the sensor data output by the motion sensor 301. The index computation unit 214 is capable of computing the ground contact time rate by ground contact time/(ground contact time+idle leg time) and the idle leg time rate by idle leg time/(ground contact time+idle leg time).

The amount of braking corresponds to the amount of decrease in the forward and rearward speed during the section where one foot is landing (i.e., the section from when one foot lands to when the other foot leaves the ground, hereinafter referred to as the "landing section"). The index computation unit 214 may compute the amount of braking by integrating the rearward component of the acceleration vector indicated by the sensor data output by the motion sensor 301 over the landing section.

The amount of body drop corresponds to the difference between the position at the landing of one foot and the position at the lowest point thereafter (when the hips are at their lowest position). The index computation unit 214 may determine the amount of body drop by integrating the vertical component of the acceleration vector indicated by the sensor data output by the motion sensor 301 from the time of landing to the time point when the position is at its lowest point. In addition, the index computation unit 214 may determine the amount of body drop to height ratio by dividing the amount of body drop by the height of the user 10. The index computation unit 214 is capable of determining the time from when one foot lands to when the position is at its lowest point as the body drop time.

The braking time corresponds to the time from the time of landing until the time when the forward and rearward component of the acceleration vector changes to the propulsive direction. The index computation unit 214 may determine the braking time by identifying the time point of the landing and the time point when the forward and rearward component of the acceleration vector indicated by the sensor data output by the motion sensor 301 changes to the propulsive direction. The index computation unit 214 may determine the time from the time point when the forward and rearward component of the acceleration vector changes to the propulsion direction to the time of leaving the ground as the propulsion time.

The landing impact corresponds to the amount of shock upon landing, also referred to as peak impact volume. The index computation unit 214 is capable of computing the maximum value of the acceleration as the landing impact on the basis of each component of the acceleration vector immediately after landing, as indicated by the sensor data output by the motion sensor 301.

The kicking acceleration corresponds to the magnitude of the acceleration during the propulsion, and the index computation unit 214 may determine the kicking acceleration on the basis of the magnitude of the forward and rearward component of the acceleration vector indicated by the sensor data output by the motion sensor 301. The kicking time corresponds to the time during which acceleration in the propulsive direction is occurring during the landing period. The index computation unit 214 may measure the time during which the forward and rearward component of the acceleration vector indicated by the sensor data output by the motion sensor 301 is generated to determine the kicking time. Alternatively, the index computation unit 214 may determine the kicking time by measuring the time from a time point when the position is at the lowest point to a time when one foot leaves the ground on the basis of the vertical component of the acceleration vector indicated by the sensor data.

The amount of pelvic rotation corresponds to the amount of rotation of the hips during the interval from the landing and leaving the ground of one foot to the landing again of the foot (hereinafter, referred to as the "two-step cycle interval") or during the interval from the landing of one foot to the subsequent landing of the other foot (hereinafter, referred to as the "one-step cycle interval"). The index computation unit 214 may determine the amount of pelvic rotation in the two-step cycle interval or the one-step cycle interval on the basis of the lateral component of the acceleration vector indicated by the sensor data output by the motion sensor 301 and the rotation speed represented by the frontward and rearward component.

The stiffness corresponds to a spring constant when the foot is regarded as a spring, and the index computation unit 214 may compute the stiffness on the basis of the change in the vertical component of the acceleration vector indicated by the sensor data output by the motion sensor 301. The index computation unit 214 may also determine the stiffness to weight ratio by dividing the stiffness by the weight of the user 10.

The landing angle corresponds to the angle between the acceleration vector and the horizontal plane or belt surface of the treadmill when one foot lands, and the kick-off angle corresponds to the angle between the acceleration vector and the horizontal plane or belt surface when the foot leaves the ground. The index computation unit 214 is capable of computing the landing angle and kicking angle on the basis of the components of the directions along the three axes of the acceleration sensor as indicated by the sensor data output by the motion sensor 301.

The horizontal impact force corresponds to the amount of horizontal impact force that the user 10 receives during the two-step cycle interval. The index computation unit 214 is capable of computing the maximum change amount in the lateral direction component of the acceleration vector in the two-step cycle interval as the horizontal impact force on the basis of the sensor data output by the motion sensor 301.

The pelvic rearward tilt amount corresponds to the maximum value of the angle in the rearward tilt direction of the hips after landing. The index computation unit 214 is capable of computing the pelvic rearward tilt amount on the basis of the components of the acceleration vector in the directions indicated by the sensor data output by the motion sensor 301.

The pelvic drop amount corresponds to the amount of tilt that occurs when the pelvis fails to be supported horizontally with respect to the landing impact. The index computation unit 214 is capable of computing the pelvic drop amount from the amount of change between the angle at the landing and the maximum raising angle on the standing leg side on the basis of the components of the acceleration vector in the directions indicated by the sensor data output by the motion sensor 301 during the landing section from landing of one foot to the leaving of the ground.

The pelvic lift amount corresponds to the angle that indicates the maximum amount of rotation of the pelvis from the moment of the foot landing when the pelvis is viewed from the front. The index computation unit 214 is capable of computing the pelvic lift amount from the amount of change between the angle at the landing and the maximum lift angle on the swinging leg side on the basis of the components of the acceleration vector in the directions indicated by the sensor data output by the motion sensor 301 in the interval from the maximum lift on the standing leg side to the next landing.

The time point of pelvic rotation after landing corresponds to a characteristic of the pelvic rotation movement as a percentage of when the pelvis is swung forward on the landing leg side. The index computation unit 214 is capable of searching before and after the landing in a time range of half the time from the landing to the next landing, and computing the percentage (%) of the time from the time when the hips rotated most to the landing divided by the time from the landing to the next landing as the pelvic rotation time point after the landing.

The forward tilt angle corresponds to the tilt angle of the sensor device 301 in the direction of travel relative to the vertical direction. The index computation unit 214 is capable of computing the forward tilt angle as the value obtained by averaging the tilt angle in the traveling direction with respect to the vertical direction over the two-step cycle interval on the basis of the vertical component of the acceleration vector and the forward and rearward component indicated by the sensor data output by the motion sensor 301. The index computation unit 214 is also capable of computing the forward tilt angle at specific time point such as when one foot lands, when one foot leaves the ground, or when the position is at the lowest point.

The peak impact slope represents the load on the foot at landing. The index computation unit 214 is capable of computing the peak impact slope by dividing the landing impact described above by the time from the time of landing to the time of maximum landing impact. Alternatively, the index computation unit 214 may convert a value obtained by dividing the landing impact by the time from the time of landing to the time of maximum landing impact into an angular parameter by an inverse trigonometric function (e.g., inverse tangent function: Arctangent) and compute the converted angular parameter as the peak impact slope.
Server FIG. 2 shows an example of a block diagram of a server 100 according to an embodiment of the present invention. The server 100 may include a controller 110, communication unit 120, display 130, input/output unit 140, and storage 170.

The storage 170 is typically embodied by various storage media such as a hard disc drive (HDD), solid state drive (SSD), and flash memory, for example, and may have the function of storing various programs and data needed for the server 100 to operate. The storage 170 may include a memory (e.g., RAM, and ROM) that provides a working area for the controller 110.

The controller 110 may typically correspond to a processor, which may be embodied by a central processing unit (CPU), MPU, or GPU, for example. The controller 110 may perform the functions and methods shown in the embodiments by reading the programs stored in the storage 170 and executing the codes or instructions contained in the read programs.

The communication unit 120 may be implemented as hardware such as a network adapter, communication software, and combinations thereof. The communication unit 220 may transmit and receive various data to and from the user terminal 200 via the network 500 using any communication protocol.

The input/output unit 140 may include an input device for entering various operations to the server 100 and an output device for outputting the processing results processed by the server 100. The input device may include, for example, a touch panel, a touch display, a hardware key such as a keyboard, a pointing device such as a mouse, a camera, and a microphone. The output device outputs the processing results processed by the controller 110, and may include, for example, a touch panel, and a speaker.
(2) Functional Configuration of Server The server 100 may include a generator 111, an acquisition unit 112, a time correction unit 113, a ranking determination unit 114, and a determination unit 115 as functions embodied by the controller 110. In FIG. 2, the functional units that are not needed in the embodiments described hereinafter may be omitted. The functions or processings of each functional unit may be embodied by machine learning or AI to the extent feasible.

The generator 111 may generate drive information to drive the indoor aerobic exercise device 400 on which the user 10 that participates in the virtual race runs on the basis of the course geometry including at least the running distance and slope set for the virtual course.

Figures 5A, 5B:
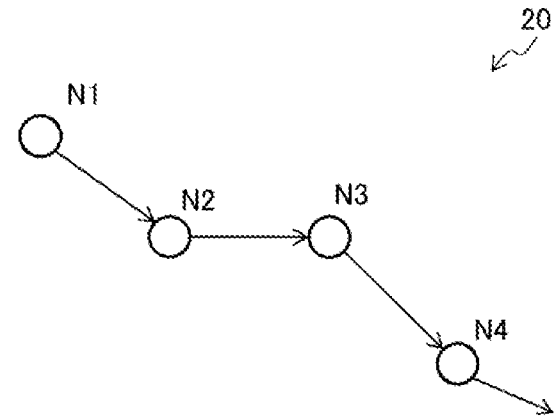
FIG. 5A is a schematic diagram illustrating a virtual course by node data.
FIG. 5B is a table illustrating an example of course geometry information according to an embodiment of the present invention.

With reference to FIGS. 5A and 5B, the data used to specify the course geometry of a virtual course used for a virtual race according to an embodiment of the present invention will be described. For example, a virtual course may be represented by node data 20 as shown in FIG. 5A, and the distance and slope of the virtual course may be specified by the position coordinates of the nodes. For example, FIG. 5B shows an example of a course geometry information table that associates the node numbers with their position coordinates (X, Y, and Z coordinates). As shown in FIG. 5B, a plurality of types of virtual courses may be specified, and node data may be stored for each course ID that uniquely identifies a corresponding virtual course. Further, in one embodiment of the present invention, a target value for the running speed in the virtual course (i.e., the rotational speed of the belt of the treadmill 400) may be set in advance. For example, in the example in FIG. 5B, the position coordinates of the node numbers N1 and N2 of the course identified by the course ID "course_001" in the course geometry information table TB30 correspond to (X, Y, Z)=(x1, y1, z1) and (x2, y2, z2), respectively, and a slope is present between the node numbers N1 and N2. The running speed (belt rotation speed) between the node numbers N1 and N2 is set to speed v1. The data defining the virtual course is not limited to those described above.

The virtual course may also have a difficulty level. The degree of difficulty affects, for example, the number of users that are capable of completing the virtual race and the completion time. For example, a course with a high treadmill running speed (belt rotation speed), a course with a series of uphills, and a course with a longer running distance may be considered a course with a high degree of difficulty. In the example in FIG. 5B, the difficulty level of the course identified by the course ID "source_001" corresponds to "Level 3." In the example in FIG. 5B, the higher the numerical value is, the higher the degree of difficulty is, but the difficulty setting is not limited to this.

In one embodiment of the present invention, a virtual race may be set up by combining a plurality of virtual courses shown in FIG. 5B or only one virtual course. The generator 111 may generate drive information to drive the treadmill 400 on the basis of the node data indicating the course geometry of the virtual course that configures the virtual race as specified in the course geometry information table TB30. For example, the running information may correspond to information that causes the tilt angle of the treadmill 400 to change on the basis of the slope and distance between the nodes, the speed of the treadmill 400, and the running time. The generated drive information may be transmitted to the user terminal 200 via the communication unit 120 and from the user terminal 200 to the treadmill 400.

Returning to FIG. 2, the acquisition unit 112 may acquire an evaluation value of an index related to the running form of the user on the basis of the running information when the user 10 runs on the indoor aerobic exercise device 400. The index is as described above and may be transmitted from the user terminal 200. The evaluation value of the index may be computed by the server 100 on the basis of the running information acquired by the acquisition unit 112 via the user terminal 200. The acquisition unit 112 may also acquire the completion time of each user that has participated in the virtual race from the user terminal 200 of the user.

The time correction unit 113 may correct the completion time of the virtual race by the user on the basis of the running information. The time correction unit 113 may correct the completion time of the user on the basis of the running score of the user, which is computed from the evaluation value of the index related to the running form of the user on the basis of the running information of the user. The running score of the user may be computed on the basis of the difference between the evaluation value of the index, which is set on the basis of the correlation between the running speed and the index collected from an unspecified number of users, and the evaluation value of the index of the user.

Figure 6:
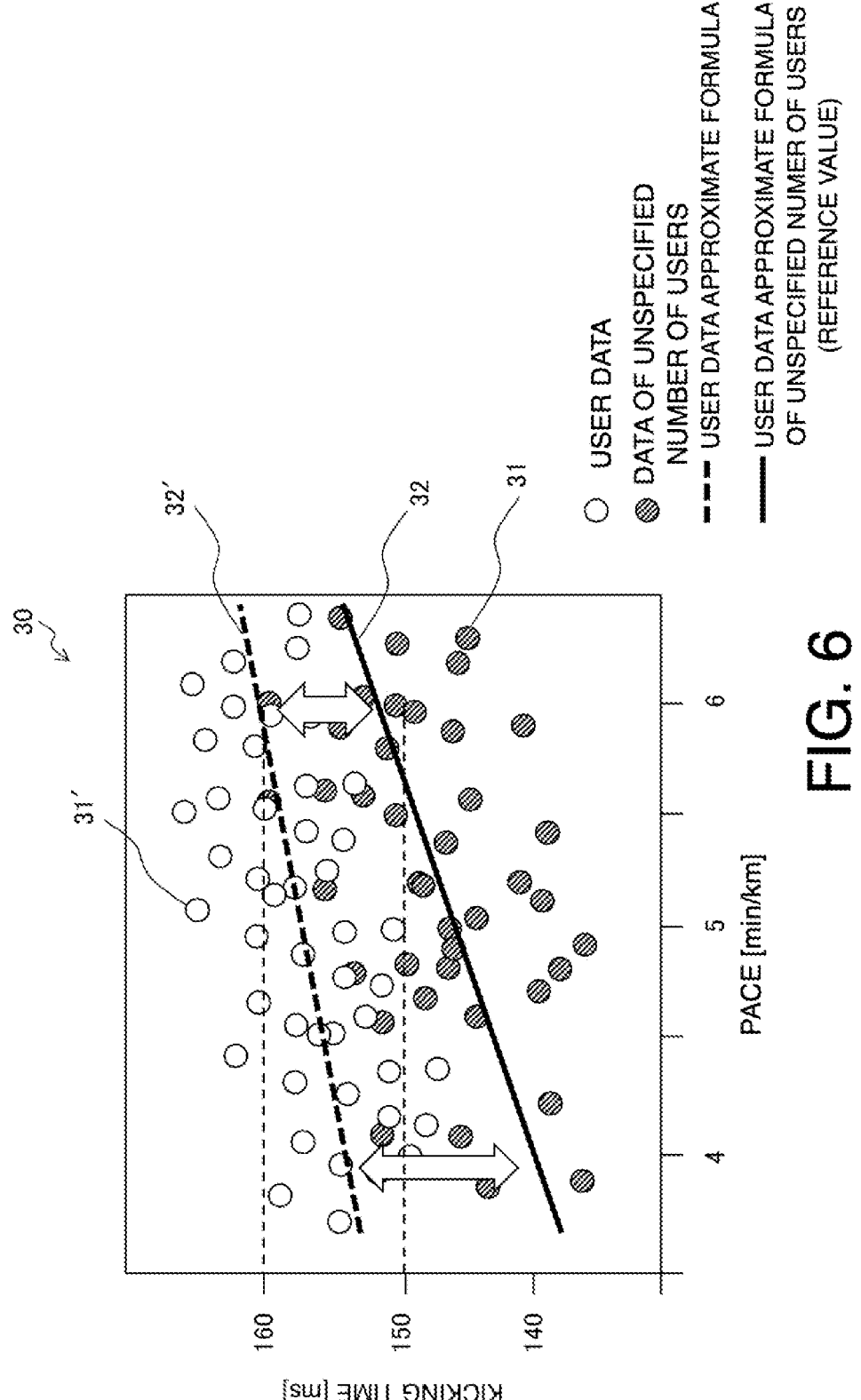
FIG. 6 is a schematic diagram illustrating scoring of index according to an embodiment of the present invention.

Here, the running score (index scoring) of the user will be described. FIG. 6 is a schematic diagram illustrating the scoring of indices. The kick-out time as an index will be described here as an example. FIG. 6 shows an example of a graph in which the horizontal axis is set as the running speed (pace) and the vertical axis is set as the index, and the data of the index (kick-out time) at a certain pace collected from an unspecified number of users is plotted, and the data 31 of the index (kick-out time) at a certain pace collected from the users (hereinafter, referred to as "scoring graph"). As shown in the scoring graph 30, an approximate line 32 of the running speed and index may be computed from the data 31 of an unspecified number of users, and an approximate line 32' of the running speed and index may be computed from the data 31' of the users, and the value on the approximate line 32 may be set as the reference value for the index. For example, in the example in FIG. 6, if the value of the "kick-out time" is higher than the reference value, the running score may be set to correlate with the difference from the reference value so that the further away from the reference value the value is, the higher the score of the "whole body coordination with the pelvis as the axis" among items characterizing the running form is. In the same manner, running scores may be set for other indices and stored in the database server 101.

The computation of the running score is described using the case where the index shown in FIG. 6 is "kick-out time" as an example. For example, suppose that, on the basis of the running information of the user 10, the evaluation value of the "kick-out time" of the index at the pace "6 min/km" of the approximate formula 32' for the user 10 is "160 ms." As described above, the running score for "kick-out time" is set so that the less the value of the "kick-out time" is, the higher the score for "whole body coordination with the pelvis as the axis" among the items characterizing the running form becomes, and if, for example, the difference from the reference value is 10 ms, the running score of 10a points will contribute to the score for the "whole body coordination with the pelvis as the axis" on the basis of the preset correlation coefficient a.

In one embodiment of the present invention, the running score of the running form of the user 10 may be scored for each index on the basis of the running information measured by the motion sensor 301 as the overall score for each index, computed as a result of the scoring. At this time, the scoring may be performed for each of the items that characterize the running form described above. For example, X point for "low load landing" and X point for "stable posture" may be scored.

For example, FIG. 7 shows an example of a table stored in the database server 101, which table stores the reference values set for each index. As shown in FIG. 7, the reference value for the index may be set for each pace. For each index, data regarding the approximate line between the running speed and the index, which is acquired from the data of an unspecified number of users, may be further stored as data related to the scoring graph 30 described in FIG. 6.

The time correction unit 113 may perform the scoring described above in accordance with the value of the index of the user 10 and the scoring graph (the association between the index and score). The completion time of the user 10 may then be corrected in accordance with the scoring results. For example, if the score of the user is less than or equal to a predetermined threshold, the completion time may be corrected to be slower, or in contrast, if the score of the user is greater than or equal to a predetermined threshold, the completion time may be corrected to be faster. The ranking determination unit 114 may then determine the ranking of the user that participates in the virtual course on the basis of the corrected completion time corrected by the time correction unit 113.

With reference to FIG. 8, this will be illustrated. FIG. 8 is a schematic diagram illustrating a change in rankings by the correction of the completion times. In the example in FIG. 8, the user B is ranked second in terms of the completion time, but her/his completion time is corrected by the score "54," and her/his corrected completion time ranks her/him twentieth. The user D is ranked fourth in terms of the completion time, but her/his completion time is corrected by the score "89," and her/his corrected completion time ranks her/him second. Any method of correction may be used.

As described above, according to an embodiment of the present invention, the ranking of the user in the virtual race may be corrected in accordance with the running form of the user. Accordingly, the user will be more conscious of her or his running form, aiming to run with a form that results in a higher score, and will maintain a high level of motivation even when running indoors. Even if the running time is slow, the user can be given an opportunity to participate in the virtual course, even indoors, since the rank may be changed depending on the running form.

The correction of the completion time may be more finely tuned in accordance with the characteristics of the running of the user. For example, FIG. 6 shows that the user has a greater difference from the reference value when running at 4.0 min/km than when running at 6.0 min/km. That is, the running form of the user when the user runs at 4.0 min/km is worse than when the user runs at 6.0 min/km. On the basis of this, the time correction unit 113 may correct the completion time so that the added time range is greater when the user runs at 4.0 min/km than when the user runs at 6.0 min/km.

In one embodiment of the present invention, multiple types of virtual courses may be set depending on the level of the user 10 that participates in the virtual race. That is, the virtual course to be run may vary depending on the level of the users that participate in the same virtual race. For example, a user with a beginner level may be able to select a virtual course with a difficulty level of one or higher, and a user with an intermediate level may be able to select a virtual course with a difficulty level of four or higher.

The generator 111 may generate display information for displaying a screen that allows the user to select a virtual course on the user terminal 200. FIGS. 9A and 9B each are an example of a display screen of the user terminal 200. FIGS. 9A and 9B each are an example and are not limited to this. As shown in FIG. 9A, the user 10 may be able to select the virtual course she or he will be running on from the screen 51, which allows selection of a virtual course. The acquisition unit 112 may acquire, from the user terminal 200, information on the virtual course selected by the user from among multiple types of virtual courses. The generator 111 may generate drive information to drive the treadmill 400 of the user 10 on the basis of the course geometry of the virtual course selected by the user 10. FIG. 9B will be described below.

As described above, according to one embodiment of the present invention, in a virtual race, the user 10 is capable of running a virtual course in accordance with her/his level. This eliminates barriers to participation in virtual races and activates virtual races by allowing users of various levels to participate in virtual races.

In one embodiment of the present invention, the generator 111 may generate display information to display a screen on the user terminal 200, which screen presents a virtual course in accordance with the level of the user 10 participating in the virtual race. The determination unit 115 of the server 100 may determine the virtual course in accordance with the level of the user 10 on the basis of the user information table TB10 and course geometry information table TB30 stored in the database server 101. The determination may be performed on the basis of a database that associates the level of the user with the difficulty of the virtual course in advance. For example, if the level of the user corresponds to "beginner" or "intermediate," virtual courses with difficulty levels 1 to 3 and 4 to 6 may be selected, respectively.

FIG. 9B illustrates an example screen of the user terminal 200 on which virtual courses at the level recommended for the user 10 are displayed. FIG. 9B is an example and is not limited to this. As shown in FIG. 9B, the user 10 may be able to select the virtual course she or he will be running on from the screen 52, which allows selection of a virtual course in accordance with the level of the user 10.

As described above, according to one embodiment of the present invention, a virtual course may be proposed in accordance with the level of the user. This allows the user to select a course that is suitable for her/his level and that she/he is able to complete, thereby increasing the motivation of the user for the virtual race.

The time correction unit 113 may correct the completion time of the user 10 in accordance with the level of the virtual course that the user has run. For example, the degree of correction by the running score described above may vary depending on the level. Specifically, if the running scores of multiple users are the same, the weighting may be made such that the running score of the user that has run the virtual course at the higher level is higher. This can provide users with motivation to improve their level of skill. In contrast, a user that has run the virtual course at the lower level may be weighted to have a higher running score. This can provide an opportunity for the users at low levels to participate in virtual races.

The time correction unit 113 may also correct the completion time of the user 10 in accordance with the type of the indoor aerobic exercise device 400 that the user 10 participating in the virtual race runs. For example, if the treadmill 400 of the user 10 is of a type that does not allow changing the tilt angle, the time correction unit 113 may make a correction that slows down the completion time of the user 10. This allows users to participate in virtual races independent from the type of the treadmill 400 used by the user 10.

In one embodiment of the present invention, the generator 111 generates drive information to drive the course geometry in accordance with the type of the indoor aerobic exercise device 400 that the user 10 participating in the virtual race runs, and the course geometry when the user 10 runs on the indoor aerobic exercise device 400 for which the slope cannot be set, may be set to have a longer running distance than the course geometry when the user 10 runs on the indoor aerobic exercise device 400 for which the slope can be set. For example, data on course geometry that fails to include a slope, corresponding to course geometry that includes a slope may be stored in advance in the database server 101, and the generator 111 may generate the drive information using the data stored in the database server 101.

Figures 10A, 10B:
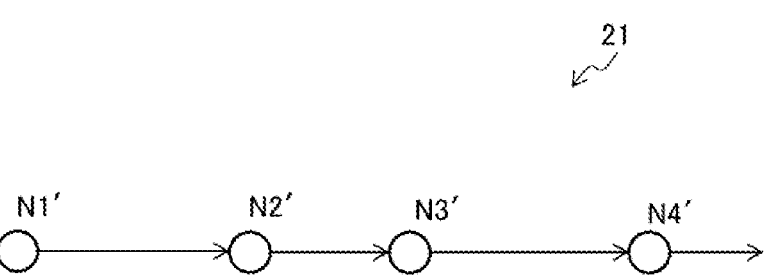
FIG. 10A is a schematic diagram illustrating a virtual course by node data.
FIG. 10B is a table illustrating an example of course geometry information according to an embodiment of the present invention.

With reference to FIGS. 5A, 5B, and 10, a description will be made below. As described above, FIGS. 5A and 5B show examples of node data showing the geometry of the virtual course, and the virtual course represented by node data 20 (here, the course identified by the course ID "course_001" in the course geometry information table TB30 in FIG. 5B) includes a slope. Here, according to one embodiment of the present invention, if the indoor aerobic exercise device 400 corresponds to a model that cannot change the tilt angle, the course geometry that the user 10 runs in the virtual race may be changed to one that fails to include a slope. For example, FIG. 10A may show a node data 21 with course geometry that lacks a slope, and FIG. 10B may show an example of course geometry information table TB31 regarding the position coordinates of each node contained in the node data 21. Here, node numbers N1', N2' . . . in the node data 21 of the virtual course without slope correspond to node numbers N1, N2 . . . in the node data 20 of the virtual course with slope. For example, N1' to N2' of a virtual course without slope may correspond to the slope portion N1 to N2 of a virtual course with slope. In this case, the distance between N1' and N2' is set longer than the distance between N1 and N2, and further, the running speed v11 between N1' and N2' is set higher than the running speed v1 between N1 and N2. That is, the course geometry may be set so that the load is provided equivalent to the load that would be applied if a slope is present.

As described above, according to one embodiment of the present invention, running information may be provided to the indoor aerobic exercise device 400 in which tilt angle cannot be changed such that the load is provided equivalent to that of a device with a variable tilt angle. This provides the motivation to participate in virtual races even to the user 10 that uses the indoor aerobic exercise device 400 in which the tilt angle cannot be changed.

Server Control Flowchart

Figure 11:
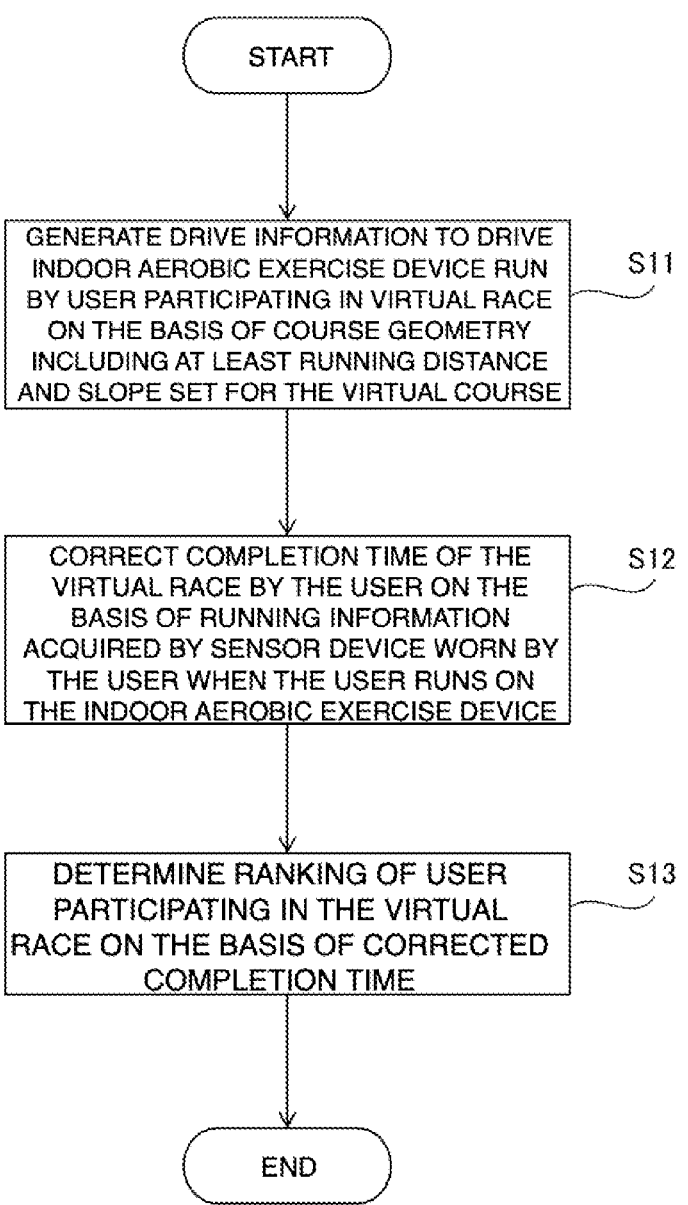
FIG. 11 is a flowchart showing an example of an operation of a server according to an embodiment of the present invention.

With reference to the flowchart in FIG. 11, the control method of the server 100 will be described. The generator 111 of the server 100 may generate drive information to drive the indoor aerobic exercise device 400 that the user participating in the virtual race runs on the basis of the course geometry including at least the running distance and slope set for the virtual course (step S11). The drive information may be as described above.

The time correction unit 113 may correct the completion time of the virtual race by the user 10 on the basis of the running information acquired by the sensor device 301 worn by the user 10 when the user 10 runs on the indoor aerobic exercise device 400 (step S12). The completion time may be acquired from the indoor aerobic exercise device 400 via the user terminal 200. Alternatively, the completion time may be recorded by the race application on the user terminal 200 and transmitted from the user terminal 200 to the server 100.

The ranking determination unit 114 may determine the ranking of the user that participates in the virtual race on the basis of the corrected completion time (step S13). The ranking determination unit 114 may determine the ranking for all the users that have participated in the virtual race.

Although the embodiments of the present invention have been described on the basis of various drawings and examples, those skilled in the art would be able to make various changes and modifications on the basis of the present disclosure. Accordingly, these variations and modifications are included within the scope of the present invention. For example, the functions included in each method and step, for example, may be rearranged to be avoided to be logically inconsistent, and multiple methods and steps may be integrated or divided. The configurations shown in the embodiments above may be combined as appropriate. For example, each of the components described as provided by the server 100 may be distributed and embodied by multiple servers. The processes described as the functions of the server 100 may also be performed by the user terminal 200, sensor devices 301, 302, and indoor aerobic exercise device 400. In contrast, the process assumed to be performed by the user terminal 200 may be performed by the server 100, sensor devices 301, 302, or indoor aerobic exercise device 400.

For example, a form in which the drive information is transmitted to the indoor aerobic exercise device 400 via the user terminal 200 has been described above. However, if the indoor aerobic exercise device 400 has a communication function, the drive information may be transmitted directly from the server 100 to the indoor aerobic exercise device 400 via the network 500.

The motion sensor 301 and vital sensor 302 may further include a position information acquisition unit, which may acquire the position information as the user 10 runs indoors.

In addition, video images may be used to evaluate the running form of the user 10. For example, the running form may be evaluated by analyzing the video images captured by an imaging device of the user 10 running.

Further, a form in which the indoor aerobic exercise device 400 is driven by the drive information has been described above. However, the indoor aerobic exercise device 400 may be operated directly by the user 10 via an operation unit provided on the indoor aerobic exercise device 400. In this case, the driving history of the indoor aerobic exercise device 400 may be transmitted from the indoor aerobic exercise device 400 to the user terminal 200, and the completion time may be corrected taking the driving history into account.

Moreover, a form in which the completion time is corrected on the basis of the running information has been described above. However, the completion time may be corrected on the basis of the biometric information. For example, heart rate, pulse, and blood pressure may be measured by the vital sensor 302 during running as the biometric information, and the completion time may be corrected by scoring the biometric information. The scoring may be the same as that in the case of the running information. For example, the association between the biometric information and biometric score may be predetermined on the basis of the correlation between the running speed and biometric information at the time of running collected from an unspecified number of users, and the biometric score may be computed in accordance with how much the value of the biometric information of the user differs from the association. The completion time may then be corrected by weighting in accordance with the biometric score, for example.

In one embodiment of the present invention, the ranking may also include the users running outdoors along with the users running on the indoor aerobic exercise device 400. For example, a real outdoor course may be embodied as a virtual course, and a race may be held involving the users that run on the outdoor course and the users that run on the virtual course.

The functional units of the server 100 or the user terminal 200 may be embodied by a logic circuit (hardware) formed in an integrated circuit (IC) chip and large scale integration (LSI), for example, or by a dedicated circuit, or by software using a central processing unit (CPU). Each functional unit may be embodied by one or more integrated circuits, and the functions of the plurality of functional units may be embodied by a single integrated circuit.

The programs according to the embodiments of the present disclosure may be provided as stored in a storage medium that can be read by the information processing device. The storage medium is directed to a "non-transitory tangible medium" capable of storing programs. The programs may include, for example, software programs and information processing device programs. When the functional units of the information processing device 100 are embodied by software, the information processing device 100 functions as the generator 111, acquisition unit 112, time correction unit 113, ranking determination unit 114, and determination unit 115 by causing a processor to execute a program loaded on the memory.

The storage media, as appropriate, may include one or more semiconductor-based or other integrated circuits (ICs) (e.g., field programmable gate arrays (FPGAs), and application-specific ICs (ASICs)), hard disk drives (HDDs), hybrid hard drives (HHDs), optical disks, optical disk drives (ODDs), magneto-optical disks, magneto-optical drives, floppy diskettes (registered trademark), floppy disk (registered trademark) drives (FDDs), magnetic tapes, solid state drives (SSDs), RAM drives, secure digital cards or drives, any other suitable storage media, or a suitable combination of two or more of these. The storage medium may be volatile, nonvolatile, or a combination of volatile and nonvolatile as appropriate.

The program according to the present disclosure may be provided to the information processing device 100 via any transmission medium (e.g., communication network, broadcast wave) capable of transmitting the program.

The embodiment of the present disclosure may also be embodied in the form of a data signal embedded in a carrier wave, where the above described program is embodied by electronic transmission. The programs of the present disclosure may be implemented using, for example, JavaScript (registered trademark), Python or other scripting languages, C, Go, Swift, Koltin, and Java (registered trademark), for example.

What is claimed is:

1. An information processing device in a virtual race provision system that provides a virtual race on a virtual course using an indoor aerobic exercise device, the information processing device comprising:

a generator that generates drive information to drive an indoor aerobic exercise device run by a user that participates in a virtual race on the basis of course geometry set for a virtual course, the course geometry including at least a running distance and slope;

a time correction unit that corrects completion time of the virtual race by the user on the basis of running information acquired by a sensor device worn by the user when the user runs on the indoor aerobic exercise device; and a determination unit that determines a ranking of the user that participates in the virtual race on the basis of the corrected completion time corrected by the time correction unit, wherein the time correction unit corrects the completion time of the user on the basis of a running score of the user, which is computed from an evaluation value of an index related to a running form of the user on the basis of the running information of the user, and the running score of the user is computed on the basis of a difference between an evaluation value of the index, which is set on the basis of correlation between running speed and the index collected from an unspecified number of users, and an evaluation value of the user.

2. The information processing device according to claim 1, further comprising an acquisition unit that acquires biometric information of the user, wherein the time correction unit corrects the completion time of the user on the basis of the running score of the user and a difference between a biometric reference value, which is set on the basis of correlation between running speed and biometric information during running collected from an unspecified number of users, and a value of the biometric information of the user during running.

3. The information processing device according to claim 1, wherein a plurality of types of virtual courses are set in accordance with level indicating running ability of the user that participates in the virtual race, and the generator generates drive information to drive the indoor aerobic exercise device of the user on the basis of course geometry of the virtual course selected by the user among the plurality of types of virtual courses.

4. The information processing device according to claim 3, wherein the generator further generates display information to display a screen on a communication terminal of the user, which screen presents a virtual course in accordance with the level of the user that participates in the virtual race.

5. The information processing device according to claim 3, wherein the time correction unit corrects the completion time of the user in accordance with difficulty of the virtual course that the user has run.

6. The information processing device according to claim 1, wherein the time correction unit corrects the completion time of the user in accordance with a type of the indoor aerobic exercise device on which the user that participates in the virtual race runs.

7. The information processing device according to claim 1, wherein the generator generates drive information to drive course geometry in accordance with a type of the indoor aerobic exercise device on which the user that participates in the virtual race runs, and course geometry when the user runs on the indoor aerobic exercise device in which the user is disabled to set the slope is set to be longer than course geometry when the user runs on the indoor aerobic exercise device in which the user is enabled to set the slope.

8. A method for controlling an information processing device in a virtual race system that provides a virtual race on a virtual course using an indoor aerobic exercise device, the method causing the information processing device to perform the steps of:

generating drive information to drive an indoor aerobic exercise device run by a user that participates in a virtual race on the basis of course geometry set for a virtual course, the course geometry including at least a running distance and slope;

correcting completion time of the virtual race by the user on the basis of running information acquired by a sensor device worn by the user when the user runs on the indoor aerobic exercise device; and determining a ranking of the user that participates in the virtual race on the basis of the corrected completion time corrected in the correcting step, wherein the correcting step includes correcting the completion time of the user on the basis of a running score of the user, which is computed from an evaluation value of an index related to a running form of the user on the basis of the running information of the user, and the determining step includes determining the running score of the user on the basis of a difference between an evaluation value of the index, which is set on the basis of correlation between running speed and the index collected from an unspecified number of users, and an evaluation value of the user.

9. A non-transitory computer readable medium storing therein a control program for an information processing device in a virtual race system that provides a virtual race on a virtual course using an indoor aerobic exercise device, the control program causing the information processing device to execute the functions of:

generating drive information to drive an indoor aerobic exercise device run by a user that participates in a virtual race on the basis of course geometry set for a virtual course, the course geometry including at least a running distance and slope;

correcting completion time of the virtual race by the user on the basis of running information acquired by a sensor device worn by the user when the user runs on the indoor aerobic exercise device; and determining a ranking of the user that participates in the virtual race on the basis of the corrected completion time corrected by the correcting function, wherein the correcting function includes correcting the completion time of the user on the basis of a running score of the user, which is computed from an evaluation value of an index related to a running form of the user on the basis of the running information of the user, and the determining function includes determining the running score of the user on the basis of a difference between an evaluation value of the index, which is set on the basis of correlation between running speed and the index collected from an unspecified number of users, and an evaluation value of the user.

* * * * *